(12) United States Patent
Fujita

(10) Patent No.: US 8,141,389 B2
(45) Date of Patent: Mar. 27, 2012

(54) CRUCIBLE LIFT DEVICE AND METHOD FOR TAKING-OUT CRUCIBLE

(75) Inventor: Takeshi Fujita, Akita (JP)

(73) Assignee: Japan Super Quartz Corporation, Akita (JP)

(*) Notice: Subject to any disclaimer, the term of this patent is extended or adjusted under 35 U.S.C. 154(b) by 338 days.

(21) Appl. No.: 12/430,401

(22) Filed: Apr. 27, 2009

(65) Prior Publication Data

US 2009/0279996 A1    Nov. 12, 2009

(30) Foreign Application Priority Data

Apr. 30, 2008  (JP) ................. 2008-119139

(51) Int. Cl.
*C03B 20/00* (2006.01)
(52) U.S. Cl. .......................... 65/260; 65/17.3
(58) Field of Classification Search .......... 65/174, 65/17.3, 260, 357, 359, 361; 414/785, 800
See application file for complete search history.

(56) References Cited

U.S. PATENT DOCUMENTS

| | | | |
|---|---|---|---|
| 3,650,701 A * | 3/1972 | Forrat .......................... | 117/216 |
| 4,416,680 A | 11/1983 | Brüning et al. | |
| 4,528,163 A | 7/1985 | Albrecht | |
| 4,964,902 A | 10/1990 | Guibert et al. | |
| 2002/0166341 A1 * | 11/2002 | Shelley et al. ................. | 65/17.3 |
| 2009/0084308 A1 | 4/2009 | Kishi et al. | |

FOREIGN PATENT DOCUMENTS

| | | |
|---|---|---|
| DE | 10033631 | 1/2002 |
| JP | 56-17996 | 2/1981 |
| JP | 56-149333 | 11/1981 |
| JP | 1-148718 | 6/1989 |
| JP | 2000219524 A * | 8/2000 |

OTHER PUBLICATIONS

English language Abstract of JP 56-17996, Feb. 20, 1981.
English language Abstract of JP 56-149333, Nov. 19, 1981.
English language Abstract of JP 1-148718, Jun. 12, 1989.

* cited by examiner

*Primary Examiner* — Jason L Lazorcik
*Assistant Examiner* — Cynthia Szewczyk
(74) *Attorney, Agent, or Firm* — Greenblum & Bernstein, P.L.C.

(57) ABSTRACT

A crucible lift device for taking a crucible out of a mold is provided with a lid member which closely contacts a limb portion defining an opening of a crucible; a decompressing mechanism which decompresses an internal space of the crucible sealed with the lid member; and a vertically-moving mechanism for the lid member. The crucible lift device includes a stand, and the vertically-moving mechanism includes a crane device which is fixed to a beam provided on an upper end of the stand and vertically moves the lid member. The decompressing mechanism includes a suction duct which penetrates the lid member to open into the internal space of crucible, and a decompressor which is connected to the suction duct. The vertically-moving mechanism can integrally lift the crucible in which the internal space is decompressed together with the lid member.

7 Claims, 4 Drawing Sheets

CRUCIBLE LIFT DEVICE AND METHOD FOR TAKING-OUT CRUCIBLE

TECHNICAL FIELD

The present invention relates to a crucible lift device and a method for mechanically taking a crucible out of a mold or the like. The crucible lift device of the invention is suitable as a device for automatically taking out of a mold, a silica glass crucible used for growing a silicon crystal.

BACKGROUND OF THE INVENTION

A silica glass crucible is used for pulling a single-crystal silicon which is a material of a semiconductor device or a crystal silicon which is a material of a solar cell. For example, the single-crystal silicon is mainly produced by heating and melting polycrystalline silicon nuggets charged into a silica glass crucible to obtain silicon melt, dipping a seed crystal into the silicon melt, and pulling the seed crystal upwards. The silicon crystal which is the material of the solar cell is also produced by the same growing method.

The silica glass crucible is produced by a rotation mold method or the like. According to this method, silica powder of a predetermined thickness is deposited on an inner surface of a crucible-like rotation mold, and the silica powder layer is heated and melted while rotating the mold, thereby glassifying the silica powder layer to produce a crucible (Japanese Patent Applications Laid-open Nos. S56-17996 and S56-149333). There is also a known method in which silica powder partially melted is cause to adhere to an inner surface of a rotation mold to produce a silica glass crucible (Japanese Patent Application Laid-open No. H01-148718).

When a produced silica glass crucible is to be taken out of the mold in conventional methods, the mold is turned upside down to take the crucible out, the mold is laid down sideways to pull out the crucible, or the crucible is pulled out using a suction cup. According to such methods, however, a risk that the crucible is damaged is high. Further, because a large amount of non-melted silica powder adheres to an outer surface of the crucible, there is a risk that the silica powder adheres to an inner surface of the crucible and damages the inner surface. The silica glass crucible is easily damaged if it is subjected to impact. Therefore, a device which mechanically grasps a crucible or a mold to take the crucible out of the mold has a high risk. Therefore, delicate adjustment of a force is required, and thus great reliance has been placed upon manual operations. However, in recent years, the crucible is increased in size, and mechanical automation which does not rely on manual operations is demanded.

SUMMARY OF THE INVENTION

The present invention has been achieved to solve the conventional problem, and provides a crucible lift device and a crucible taking-out method capable of easily taking a silica glass crucible or the like out of a mold by a following configuration.

A crucible lift device according to the present invention comprises: a lid member which closely contacts a limb portion defining an opening of a crucible; a decompressing mechanism which decompresses an internal space of the crucible sealed with the lid member; and a vertically-moving mechanism for the lid member, thereby the vertically-moving mechanism can integrally lift the crucible in which the internal space is decompressed together with the lid member.

In a preferred embodiment of the present invention, the crucible is a silica glass crucible used for pulling a silicon crystal, the silica glass crucible is attached to a mold, and the limb portion of the silica glass crucible is tightly closed with the lid member, and the internal space of the crucible is decompressed and the crucible is taken out of the mold.

In a further preferred embodiment of the present invention, the crucible lift device further comprises a stand, wherein the vertically-moving mechanism is fixed to a beam provided on an upper end of the stand, and constitutes a portion of a crane device which vertically moves the lid member, the decompressing mechanism includes a suction duct which penetrates the lid member to open into the internal space of crucible, and a decompressor which is connected to the suction duct.

In a further preferred embodiment of the present invention, the lid member has a cushioning which closely contacts the limb portion of the crucible at a circumferential edge of the lid member.

In a further preferred embodiment of the present invention, the crucible lift device further comprises a connecting plate which is connected to the lid member, wherein the connecting plate has an arm engaged with an upper end of the mold, thereby the crucible lift device can lift the mold independently from the crucible in a state where the arm is engaged with the upper end of the mold.

A crucible taking-out method according to the present invention comprises: decompressing an internal space of a crucible in a state where a lid member is in close contact with a limb portion defining an opening of the crucible accommodated in a mold, and lifting the crucible together with the lid member in a state where an internal space of the crucible is decompressed, thereby integrally taking the crucible and the lid member out of the mold.

The lift device of the present invention includes a lid member which closely contacts a limb portion defining an opening of a crucible, a unit which decompresses an internal space of the crucible sealed with the lid member, and a vertically-moving mechanism for the lid member, and integrally lifts the crucible having the decompressed internal space and the lid member. Therefore, non-melted silica powder adhering to the outer surface of the crucible does not enter the internal space and thus, there is no risk that the inner surface of the crucible is damaged. The crucible is not directly grasped, but the entire of an inside of the crucible is stuck by decompression to integrally lift the crucible and the lid member. Thus, a force is not locally applied to the crucible, and the crucible is not damaged. Further, it is unnecessary to turn the mold upside down or to lay down the mold sideways, and the crucible is lifted in a state where its upper side is opened. Therefore, there is no risk that an impact caused by contact with the crucible is not applied to the crucible, and even if the crucible is of large size, the crucible can easily be taken out, and the crucible lift device is suitable for automation.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

The present invention will be explained in detail below based on embodiments.

A crucible lift device of the present invention includes a lid member which closely contacts a limb portion defining an opening of a crucible, a unit which decompresses an internal space of the crucible which is sealed by the lid member, and a vertically-moving mechanism of the lid member. The crucible lift device of the invention can integrally lift the crucible having the decompressed internal space together with the lid member. The crucible lift device of the invention is suitable as a device which takes out of a mold, a silica glass crucible used for growing a silicon crystal and attached to the mold.

Figure 1:
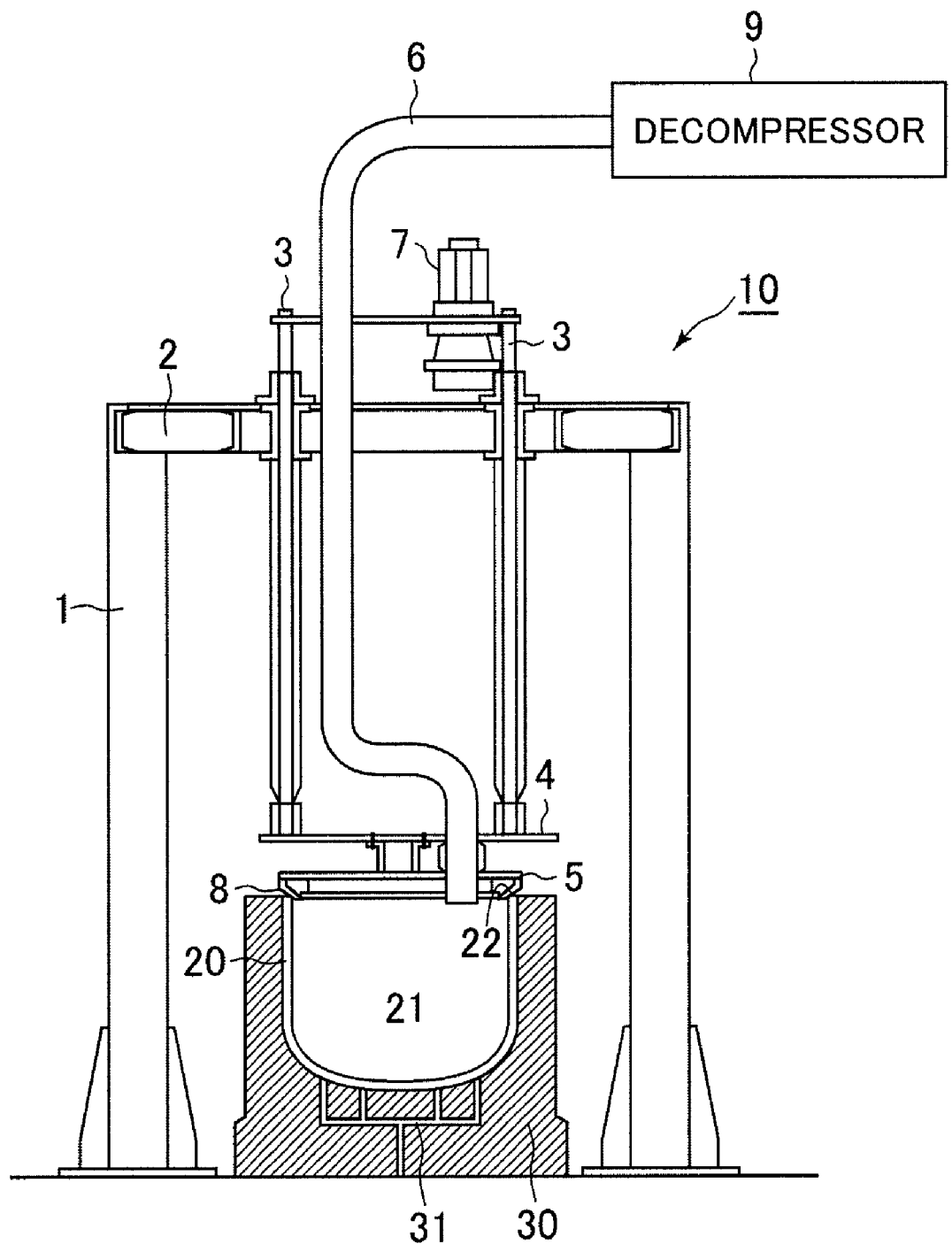
FIG. 1 is a schematic sectional view showing a state immediately before a crucible lift device of the present invention lifts a crucible.
Figure 2:
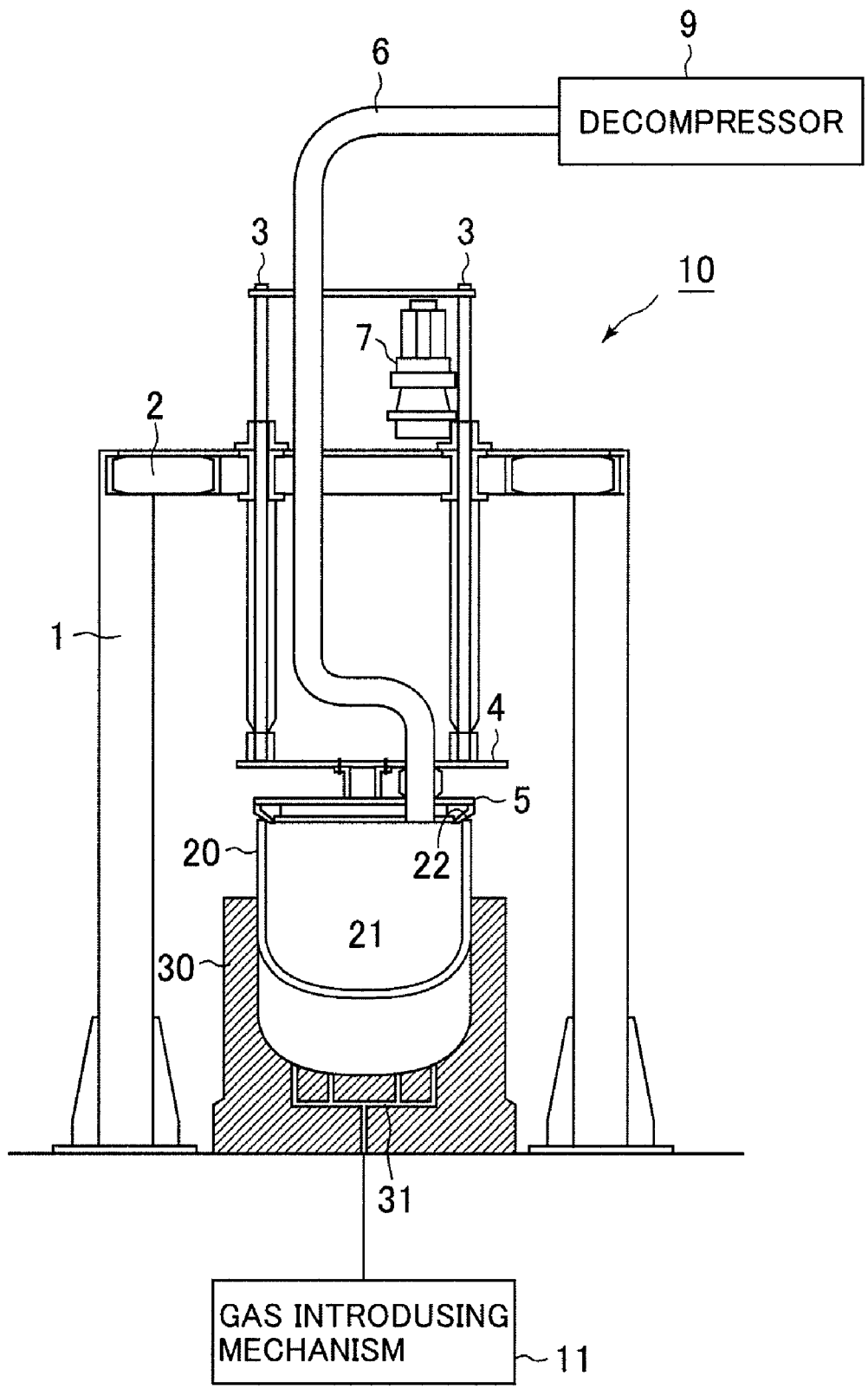
FIG. 2 is a schematic sectional view showing a state where the crucible lift device of the invention is lifting the crucible.
Figure 3:
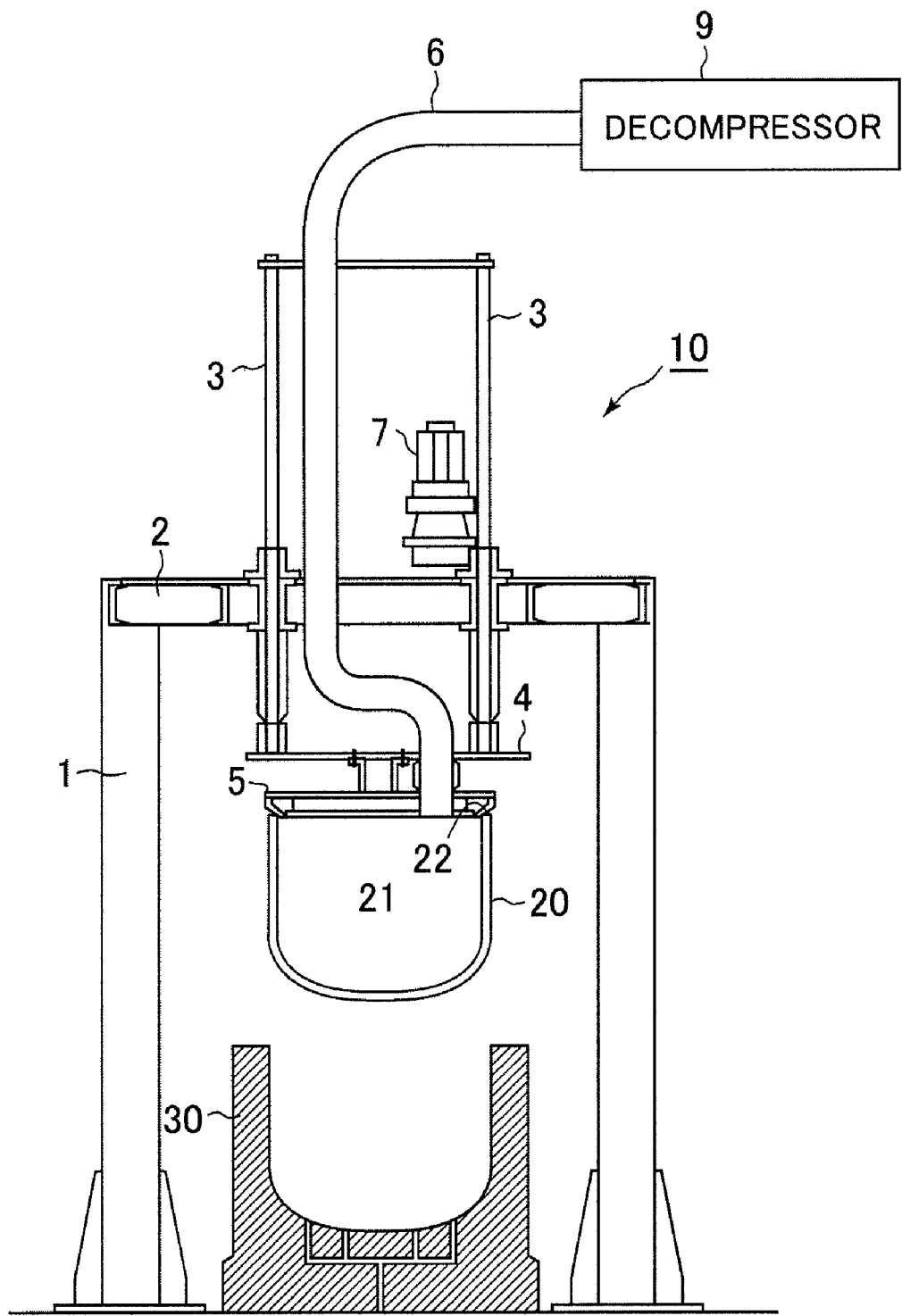
FIG. 3 is a schematic sectional view showing a state after the crucible lift device of the invention lifted the crucible.

FIGS. 1 to 3 show one example of a device structure of the lift device according to the invention. As shown in the drawings, a lift device 10 includes stands 1, shafts 3 extending downward from a beam 2 provided on upper ends of the stands 1, a connecting plate 4 attached to the shafts 3, a lid member 5 attached to the connecting plate 4, a suction duct 6 which penetrates the lid member 5 to open into an internal space 21 of a crucible 20, a depressurizing device 9 (decompressor) connected to the suction duct 6, and a vertically-moving mechanism 7 (elevating motor, or the like) which vertically moves the connecting plate 4 through the shafts 3. The shafts 3, the connecting plate 4, and the vertically-moving mechanism 7 form a crane device. The crane device needs not always to have the illustrated example.

In the illustrated device example, four shafts 3 are provided at equal distances from one another along a circumference of the lid member to stably guide vertical motion of the connecting plate 4; however, the number of the shafts 3 is not limited to four. The shafts 3 pass through the beam 2 of the stands 1 and extend vertically. The vertically-moving mechanism 7 (elevating motor) is placed on the beam 2. The shafts 3 are connected to the vertically-moving mechanism 7, the shafts 3 are rotated by the elevating motor 7, and the connecting plate 4 connected to lower ends of the shafts 3 is vertically moved.

The lid member 5 is substantially horizontally attached to a lower side of the connecting plate 4. The lid member 5 vertically moves integrally with the connecting plate 4. Preferably, a cushioning 8 which closely contacts the limb portion 22 is provided on a circumferential edge of the lid member 5. The suction duct 6 is connected to the lid member 5, one end of the suction duct 6 penetrates the lid member 5, and is connected to the internal space 21 of the crucible 20 so as to open into the internal space 21. The other end of the suction duct 6 is connected to the decompressor 9.

In the illustrated example, the crucible 20 is set into a mold 30. The mold 30 is for producing the crucible 20, for example, and the mold 30 is preferably provided with vent holes 31 which open at an inner surface of the mold 30. The vent holes 31 can be utilized for evacuation to decompress an interior of the silica powder layer when silica powder deposited on the inner surface of the mold is heated, melted, and glassified.

In the device structure described above, as shown in FIG. 1, the lift device 10 is placed above the mold 30 where the crucible 20 is placed. The lid member 5 is lowered toward the limb portion 22 defining opening of the crucible 20, the lid member 5 closely contacts the limb portion 22 of the crucible 20 through the cushioning 8, and the internal space 21 of the crucible 20 is sealed. Then, the internal space 21 is decompressed through the suction duct 6. By decompressing the internal space 21, the lid member 5 is stuck to the limb portion 22 so that the lid member 5 and the crucible 20 are unified.

After the decompression, the shafts 3 are rotated by the elevating motor 7, and the crucible 20 is lifted up integrally with the lid member 5 as shown in FIG. 2. When the crucible 20 is lifted up, the suction of the decompressor 9 can be stopped or the suction can be continued. When the lifting operation for the crucible 20 is started, it is preferable that gas such as compressed air be introduced by a gas introducing mechanism 11 in a space between the crucible 20 and the inner surface of the mold through the vent holes 31 of the mold 30. Accordingly, gas such as air enters the space between the inner surface of the mold 30 and an outer surface of the crucible 20, and therefore the crucible 20 is separated from the mold 30 easily. As shown in FIG. 3, the crucible 20 is then pulled up by further rotation of the shafts 3, and the crucible 20 is pulled out of the mold 30.

After the crucible 20 is pulled out of the mold 30, the mold 30 is pulled out in a state where the crucible 20 is held and a transfer truck (not shown) is replaced by another truck, so that the crucible 20 can be lowered, placed on the truck and conveyed. Alternatively, a traveling rail (not shown) and a traveling motor (not shown) can be provided on the beam 2 on the upper ends of the stands, so that the crucible 20 can be made to travel to outside along the traveling rail while being lifted up.

Figure 4:
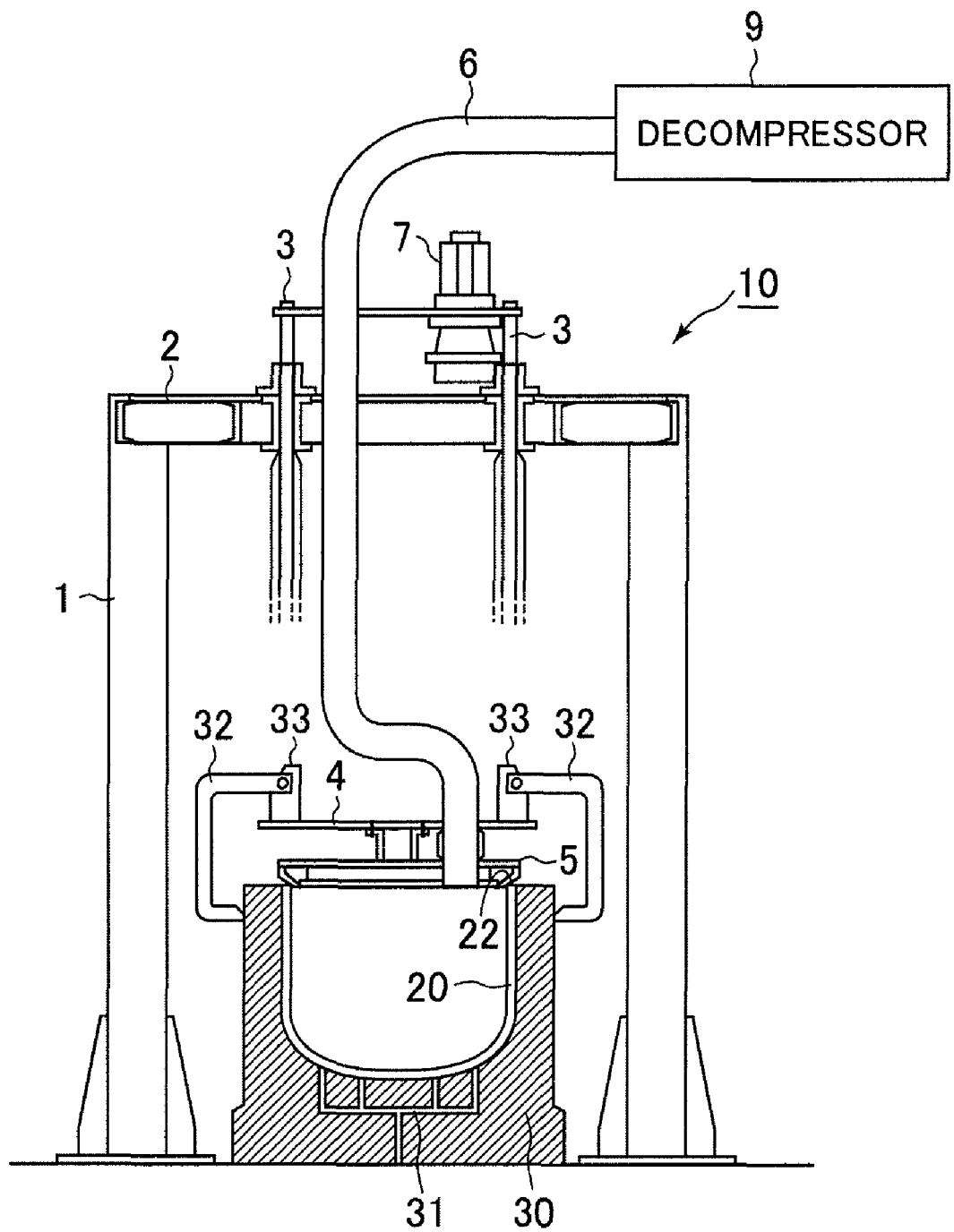
FIG. 4 is a schematic sectional view showing a structure of the crucible lift device of the invention having arms attached thereto.

As shown in FIG. 4, arms 32 which engage with an upper end of the mold can be attached to the connecting plate 4, and the connecting plate 4 can be provided with drive motors 33 which open and close the arms 32 so that the mold 30 can be lifted up. The arms 32 and the drive motors 33 can be attached directly to the lid member 5 instead of the connecting plate 4. In this case, the connecting plate 4 is unnecessary.

In this example, the connecting plate 4 is lowered, and the arms 32 are closed, so that tip ends of the arms 32 are engaged with the upper end of the mold 30. The connecting plate 4 is moved upward in this state to lift the mold 30 up. The mold 30 can be lifted up independently from the pulling out operation for the crucible 20.

According to the crucible lift device of the invention, because the crucible 20 can be lifted up integrally with the lid member 5, it is unnecessary to turn the mold 30 upside down or to lay down the mold 30 sideways, and it is unnecessary to directly grasp the crucible 20. Therefore, the crucible 20 can easily be taken out of the mold 30 without damaging the crucible 20. Because the limb portion 22 of the crucible is tightly closed with the lid member, non-melted silica powder adhering to the outer surface of the crucible does not enter the internal space, and thus there is no risk that the inner surface of the crucible is damaged. Further, tight closing of the crucible with the lid member, decompression of the crucible, and lifting of the crucible can be performed mechanically, and therefore the present invention is suitable for automation.

The present invention is in no way limited to the aforementioned embodiments, but rather various modifications are possible within the scope of the invention as recited in the claims, and naturally these modifications are included within the scope of the invention.

What is claimed is:
1. A crucible lift device assembly for removing a crucible from a mold, comprising:
  a mold for forming a silica glass crucible;
  a lid member for sealing up the silica glass crucible;
  a decompressor which decompresses an internal space of the silica glass crucible sealed with the lid member; and a vertically-moving mechanism located above the lid member which lifts the silica glass crucible together with the lid member in a state where the internal space of the silica glass crucible is decompressed, wherein one of the lid member and a connecting plate that is connected to the lid member is provided with an arm that is configured to engage the mold so that the vertically-moving mechanism can lift the mold together with the lid member in a state where the arm is engaged with the mold; and comprising a stand, wherein the vertically-moving mechanism is fixed to a beam provided on an upper end of the stand, and constitutes a portion of a crane device which vertically moves the lid member.

2. The crucible lift device as claimed in claim 1, wherein the lid member is provided with a cushioning at a portion which contacts a limb portion of the crucible that defines an opening of the crucible.

3. The crucible lift device as claimed in claim 1, further comprising a gas introducing mechanism which introduces gas in a space between an inner surface of the mold and an outer surface of the crucible.

4. The crucible lift device as claimed in claim 1, further comprising a traveling rail provided on the beam, wherein the crucible is made to travel to outside along the traveling rail while being lifted up.

5. The crucible lift device as claimed in claim 1, wherein the decompressor is connected to a suction duct which penetrates the lid member to open into the internal space of crucible.

6. A method for removing a crucible from a mold, comprising:
    forming a silica glass crucible in the mold, wherein the mold is in an upright position;
    lowering a lid member and a connecting plate that is provided with an arm towards the silica glass crucible disposed in the mold;
    decompressing an internal space of the silica glass crucible in a state where the lid member is in close contact with a limb portion defining an opening of the silica glass crucible accommodated in the mold; and
    lifting the silica glass crucible in an upward direction together with the lid member in a state where the internal space of the silica glass crucible is decompressed, thereby integrally removing the silica glass crucible out of the mold while the mold remains in an upright position; and
    moving the connecting plate upward to lift the mold independently of the lifting of the silica glass crucible while the arm is engaged with the mold.

7. The method for removing the crucible as claimed in claim 6, further comprising introducing gas in a space between an inner surface of the mold and an outer surface of the crucible while removing the crucible from the mold.

* * * * *